April 15, 1930.   H. E. ESCH ET AL   1,754,617
GARDEN TRACTOR
Filed June 7, 1929   3 Sheets-Sheet 1
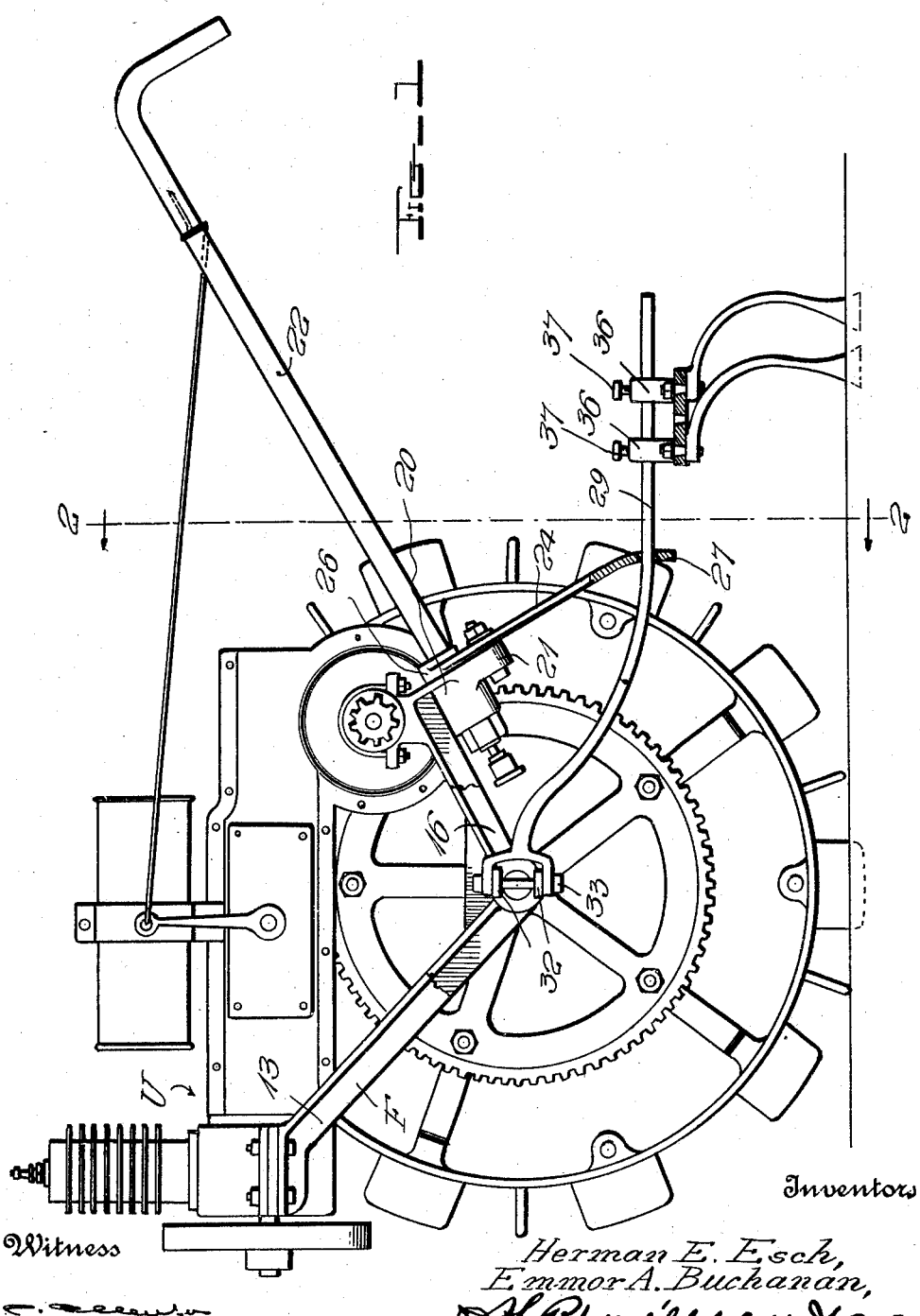
Inventors
Herman E. Esch,
Emmor A. Buchanan,
Attorneys April 15, 1930. H. E. ESCH ET AL 1,754,617
GARDEN TRACTOR
Filed June 7, 1929 3 Sheets-Sheet 2
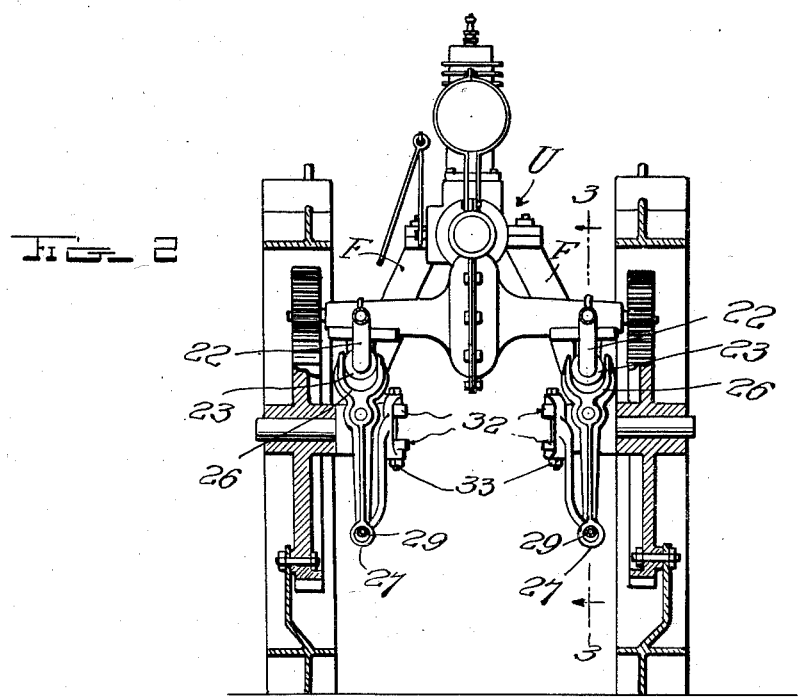
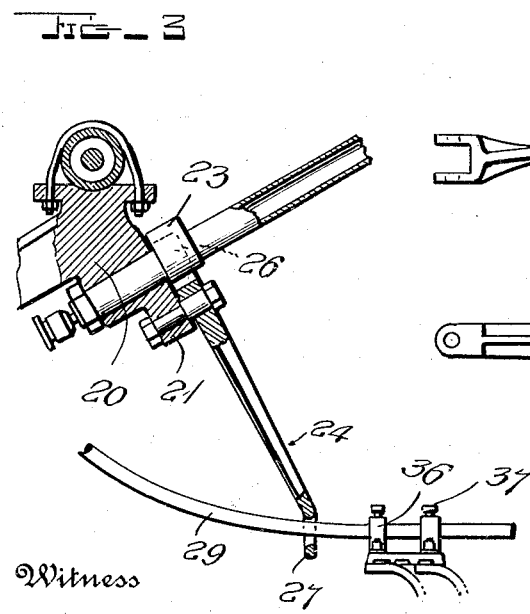
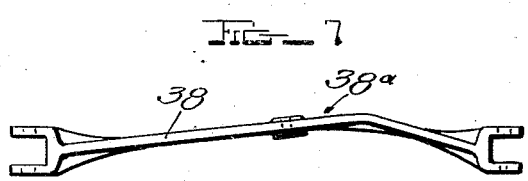
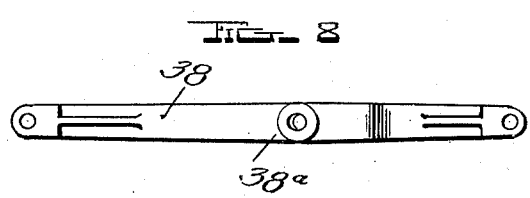
Inventors
Herman E. Esch,
Emmor A. Buchanan,
Witness
Attorneys April 15, 1930.  H. E. ESCH ET AL  1,754,617
GARDEN TRACTOR
Filed June 7, 1929    3 Sheets-Sheet 3
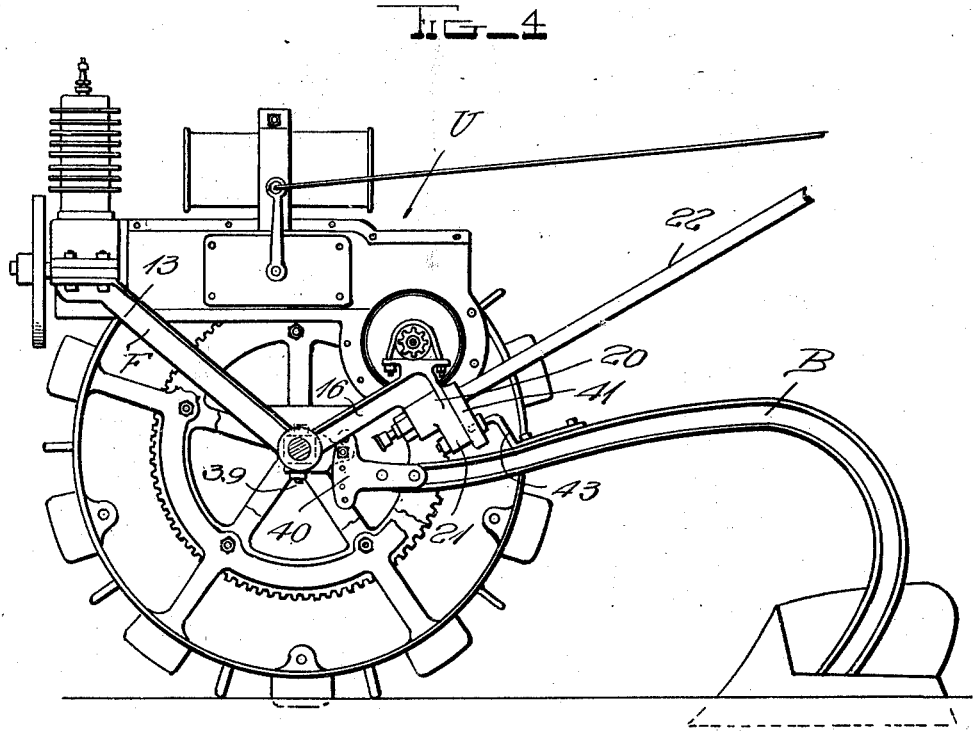
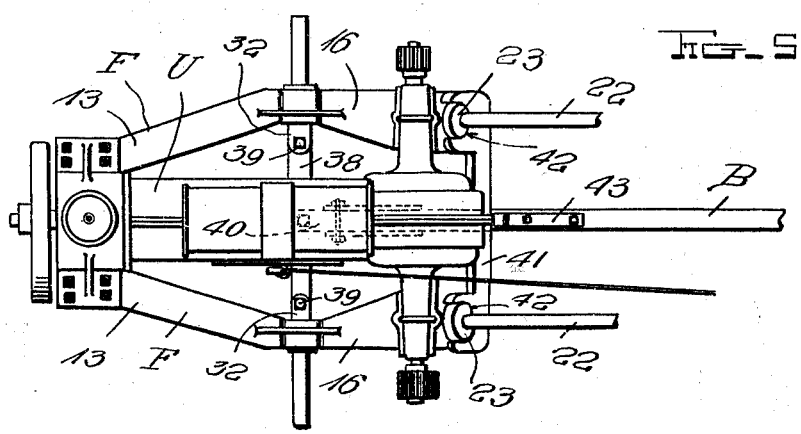
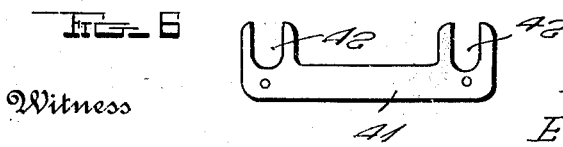
Inventors
Herman E. Esch,
Emmor A. Buchanan,
Witness
Attorneys Patented Apr. 15, 1930

1,754,617

UNITED STATES PATENT OFFICE

HERMAN E. ESCH AND EMMOR A. BUCHANAN, OF CHERRYVALE, KANSAS

GARDEN TRACTOR

Application filed June 7, 1929. Serial No. 369,185.

The invention relates to improvements in garden tractors of the general type in which the operator walks behind the machine to steer and otherwise control the same.

One object of the invention is to provide unique means whereby implements such as cultivators may be laterally swung with respect to the tractor by rotating the rearwardly inclined handles of the latter.

A further object is to provide a construction which is readily adaptable for plowing and to provide means for holding the handles against rotation when the plow is attached.

A still further aim is to provide a unique plow-attaching bar of such form that the plow will remain in proper position even though the tractor be inclined with one wheel in a furrow when plowing.

With the foregoing in view, the invention resides in the novel subject matter hereinafter described and claimed, description being accomplished by reference to the accompanying drawings.

Figure 1 is a side elevation partly broken away and in section.

Figure 2 is a vertical transverse sectional view on line 2—2 of Fig. 1.

Figure 3 is an enlarged detail section substantially on line 3—3 of Fig. 2.

Figure 4 is a side elevation partly removed and in section showing a plow and the equipment for connecting it with the tractor.

Figure 5 is a fragmentary top plan view of the parts shown in Fig. 4.

Figure 6 is a side elevation of the eccentric-holding bar shown in Figs. 4 and 5.

Figure 7 and 8 are respectively, an edge view and a top plan view of the plow hitch bar shown in Figs. 4 and 5.

While the features of construction disclosed in the accompanying drawings will be rather specifically described, it is to be understood that within the scope of the invention as claimed, variations may be made.

The tractor embodies a power unit U of the type disclosed in our patent U. S. application Serial No. 259,200, filed March 5, 1928. The unit U is supported by two side frames F to which it is secured, said frames being disposed substantially vertically at opposite sides of said unit. The front arm 13 of each frame F inclines forwardly and is secured to the unit U and the rear arm 16 of each frame F inclines rearwardly and is secured to said unit. Each arm 16 is provided with a rearwardly inclined bearing 20 and with a lug 21 projecting downwardly from the rear end of said bearing. Rearwardly inclined handles 22 have their lower ends rotatably mounted in any desired manner in the bearings 20, said handles being provided with eccentrics 23 at the rear ends of said bearings. Substantially vertical implement guiding levers 24 are fulcrumed near their upper ends to the lugs 21 as denoted at 25, the upper ends of these levers having yokes or the like 26 which receive the eccentrics 23, while the lower ends of said levers have suitable provision, such as the eyes 27, for loosely connecting them with implement beams 28, which beams are so mounted that they may laterally swing. Hence, by turning either of the handles 22, its eccentric 23 effects swinging of the associated lever 24, thus in turn swinging the subjacent beam 28 to guide the implements 29 toward or from a row as occasion may demand.

At the lower extremity of each frame F is a heavily constructed body 30, and in these bodies of the two frames, the inner ends of axle stubs 31 are embedded and anchored. Upon these stubs, the two tractor wheels 31ª are rotatably mounted, said wheels being suitably driven from the power unit U. The inner end of each body 30 is provided with upper and lower lugs 32 integral therewith and projecting laterally inward. To the lugs of the two frames F, the implements 28 are pivoted by any desired means, such as that denoted at 33, permitting lateral swinging of the implement beams. Preferably, the rear ends of these beams are straight and are provided with implement carriers 34 in the form of plates having a plurality of slots 35, permitting attachment of the cultivator teeth or other implements 29 at proper points. To connect the carriers with the beams 28, said carriers are preferably provided with apertured lugs 36 through which the beams pass, said lugs being provided with set screws 37 to hold them in any desired positions upon the beams.

When the tractor is to be used for drawing a plow P (Figs. 4 and 5), the beams 28 and the levers 24 are detached. Then, in order to provide substantial means to which to connect the front end of the plow beam B, we extend a heavy metal bar 38 transversely between the frames F and secure its ends by bolts 39 to the lugs 32. Bar 38 is provided with a normally inclined central portion 38$^a$ to which the beam B is connected by any desired means 40, the connection being preferably such as to permit some lateral swinging of said beam. When plowing, the portion 38$^a$ occupies a horizontal position with one wheel of the tractor running in a furrow and hence the plow remains in its proper upright position. Obviously, the plow follows the tractor and the connection between tractor and plow is such as to allow the operator to steer the tractor independently of the plow which will permit turning corners or plowing in close places such as around trees, etc., without lifting said plow.

The tractor may be more advantageously operated for plowing, if the handles 22 be then locked against rotation. To accomplish this, we provide a transverse bar 41 (Figs. 4, 5 and 6) having notches 42 in its ends to receive the eccentrics 23 and hold them against turning, thus similarly holding the handles 22. Bar 41 is secured to the lugs 21, preferably by the same bolts or the like 25 which formerly fulcrumed the levers 24 in said lugs. The intermediate portion of this bar is provided with a straight upper edge, co-operable with a suitable finger 43 on the plow beam B in effecting lifting of said beam when the handles 2 are lifted, and when lateral swinging of the beam takes place, the finger merely slides upon the bar. When plowing or doing other work where the bar 41 is used, this bar also takes the downward force caused by the inclination of the driving mechanism to rotate around the bull wheels (or the reaction of the driving force). When cultivating, this force is transmitted to the cultivating tools by means of the levers 24.

By providing the novel construction shown and described, or a substantial equivalent thereof, a garden tractor is provided which is rather simple and inexpensive, may be easily operated under numerous conditions, may be advantageously and conveniently used for plowing, harrowing, cultivating, etc., and will be generally desirable. The construction disclosed is preferably followed but within the scope of the invention as claimed, variations may be made as above stated.

We claim:

1. In a garden tractor, a power unit, two V-shaped side frames disposed substantially in vertical planes at opposite sides of said power unit and having wheels driven by said unit, the front and rear arms of said frames being secured to said unit, said rear arms having rearwardly inclined bearings, handles having their lower ends rotatably received in said bearings, implement-guiding levers fulcrumed to the rear portions of said arms, and means operatively connecting said handles and said levers to effect swinging of the latter upon rotation of said handles.

2. In a garden tractor, a frame structure, a rearwardly inclined handle, a bearing on the frame structure in which the lower end of said handle is rotatably mounted, an eccentric secured on said handle at one end of said bearing, and an implement guiding lever fulcrumed to the frame for swinging transversely of the tractor, said lever having a yoke in which said eccentric is received to effect swinging of the lever upon turning of said handle.

3. In a tractor which embodies a frame structure having rearwardly inclined bearings, handles whose lower ends are rotatable in said bearings, and eccentrics on said handles for operating implement adjusters; a member to extend between said eccentrics, said member being provided with portions to lock said eccentrics against rotation when desired and provided also with a plow beam-lifting portion, and means for detachably securing said member to said frame.

4. A structure as specified in claim 3; said member consisting of a bar having eccentric-receiving notches in its ends, the central portion of said bar constituting said plow beam-lifting portion.

5. In a tractor which embodies two substantially vertical wheel-supported side frames having inwardly projecting implement-attaching lugs; a transverse bar to extend between said side frames, and means for detachably securing the ends of said bar to said lugs, said bar having a central inclined plow-attaching portion which occupies a horizontal position when the wheel of one side frame travels in a furrow while plowing.

In testimony whereof we have hereunto affixed our signatures.

HERMAN E. ESCH.
EMMOR A. BUCHANAN.